(12) United States Patent
Hernandez et al.

(10) Patent No.: US 10,030,538 B2
(45) Date of Patent: Jul. 24, 2018

(54) GAS TURBINE ENGINE WITH A VANE HAVING A COOLING AIR TURNING NOZZLE

(71) Applicant: General Electric Company, Schenectady, NY (US)

(72) Inventors: Wilhelm Ramon Hernandez, Portland, OR (US); Daniel Edward Demers, Ipswich, MA (US); Tyler Frederick Hooper, Amesbury, MA (US); Victor Hugo Silva Correia, Milton Mills, NH (US); Troy Todd Dennis, Peabody, MA (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 14/933,025

(22) Filed: Nov. 5, 2015

(65) Prior Publication Data
US 2017/0130604 A1  May 11, 2017

(51) Int. Cl.
*F01D 5/14* (2006.01)
*F01D 25/12* (2006.01)
*F01D 9/04* (2006.01)

(52) U.S. Cl.
CPC ............. *F01D 25/12* (2013.01); *F01D 9/041* (2013.01); *F05D 2220/32* (2013.01); *F05D 2240/125* (2013.01); *F05D 2250/52* (2013.01); *F05D 2250/71* (2013.01); *F05D 2260/201* (2013.01); *F05D 2260/22141* (2013.01)

(58) Field of Classification Search
CPC ..................................................... F01D 5/189
See application file for complete search history.

(56) References Cited

U.S. PATENT DOCUMENTS

| 5,217,348 A | 6/1993 | Rup, Jr. et al. |
| 5,358,374 A | 10/1994 | Correia et al. |
| 5,645,397 A * | 7/1997 | Soechting ............... F01D 5/187 415/115 |
| 6,065,928 A | 5/2000 | Rieck, Jr. et al. |

(Continued)

FOREIGN PATENT DOCUMENTS

| CN | 103184899 A | 7/2013 |
| CN | 103438480 A | 12/2013 |

(Continued)

OTHER PUBLICATIONS

Extended European Search Report and Opinion issued in connection with corresponding EP Application No. 16195555.4 dated Mar. 16, 2017.

(Continued)

*Primary Examiner* — Logan Kraft
*Assistant Examiner* — Jason Fountain
(74) *Attorney, Agent, or Firm* — General Electric Company; William Andes (57) ABSTRACT

An apparatus and method of cooling a hot portion of a gas turbine engine, such as a rotor disk, by having a vane assembly with a cooling air passage and a flow control insert located within the cooling air passage defining a conduit. A turning nozzle is mounted to the vane and has a turning passage with an inlet and an outlet, the turning nozzle is fluidly coupled to the flow control insert outlet.

26 Claims, 7 Drawing Sheets

(56) References Cited

U.S. PATENT DOCUMENTS

| | | | | |
|---|---|---|---|---|
| 7,008,185 B2 * | 3/2006 | Peterman | ............... | F01D 5/189 |
| | | | | 415/115 |
| 7,249,928 B2 | 7/2007 | Klasing et al. | | |
| 8,562,285 B2 * | 10/2013 | McCaffrey | ............. | F01D 5/081 |
| | | | | 415/115 |

FOREIGN PATENT DOCUMENTS

| | | |
|---|---|---|
| EP | 0 768 448 A1 | 4/1997 |
| EP | 1 163 429 A1 | 12/2001 |
| EP | 2 011 968 A2 | 1/2009 |

OTHER PUBLICATIONS

First Office Action and Search issued in connection with corresponding CN Application No. 201610961363.0 dated Feb. 5, 2018.

* cited by examiner

GAS TURBINE ENGINE WITH A VANE HAVING A COOLING AIR TURNING NOZZLE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components, such as the high pressure turbine and the low pressure turbine, may be necessary. Typically, cooling is accomplished by ducting cooler air from the high and/or low pressure compressors to the engine components which require cooling. When cooling the turbines, cooling air may be passed through an interior of the turbine vanes.

One approach to cooling is to route the compressor air though the interior of the turbine vanes, where the cooling air can then pass into the rotor to cool portions of the rotors, such as the rotating disks on which the blades are mounted. To avoid efficiency losses, it is desirable for the cooling air exiting the vane and entering the rotor to be oriented to generally align with the rotational direction of the rotor and to match the speed of the rotating disk.

BRIEF DESCRIPTION OF THE INVENTION

In one aspect, embodiments of the invention relate to a vane assembly for a gas turbine engine having a rotational axis, the vane assembly comprising a vane having an airfoil body extending axially from a leading edge to a trailing edge and extending radially from a root to a tip. The vane includes a cooling air passage extending radially through the airfoil body and having an inlet at the tip and an outlet at the root. A flow control insert is located within the cooling air passage and defines a conduit having an inlet corresponding with the cooling air passage inlet and an outlet corresponding with the cooling air passage outlet. A turning nozzle is mounted to the vane and has a turning passage with an inlet and an outlet, the turning nozzle inlet being fluidly coupled to the flow control insert outlet. The turning passage is such that a turning passage centerline from the turning passage outlet forms a first acute angle relative to a plane perpendicular to the rotational axis.

In another aspect, embodiments relate to a turning nozzle for a vane of a gas turbine engine having a rotational axis where the turning nozzle comprises a turning passage with an inlet and an outlet and the turning passage locally turns through a smooth turn of at least 80 degrees. The turning passage has a reduced cross-sectional area downstream of the smooth turn, wherein when the turning nozzle is mounted to the vane, the turning passage turns the flow exiting the vane, which is generally radial to the rotational axis, to a flow that is generally tangential to a plane define by rotation of the radial line about rotational axis.

2

DESCRIPTION OF EMBODIMENTS OF THE INVENTION

The described embodiments of the present invention are directed to systems, methods, and other devices related to component cooling, particularly in a gas turbine engine, and more particularly to cooling components of a turbine section of a gas turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
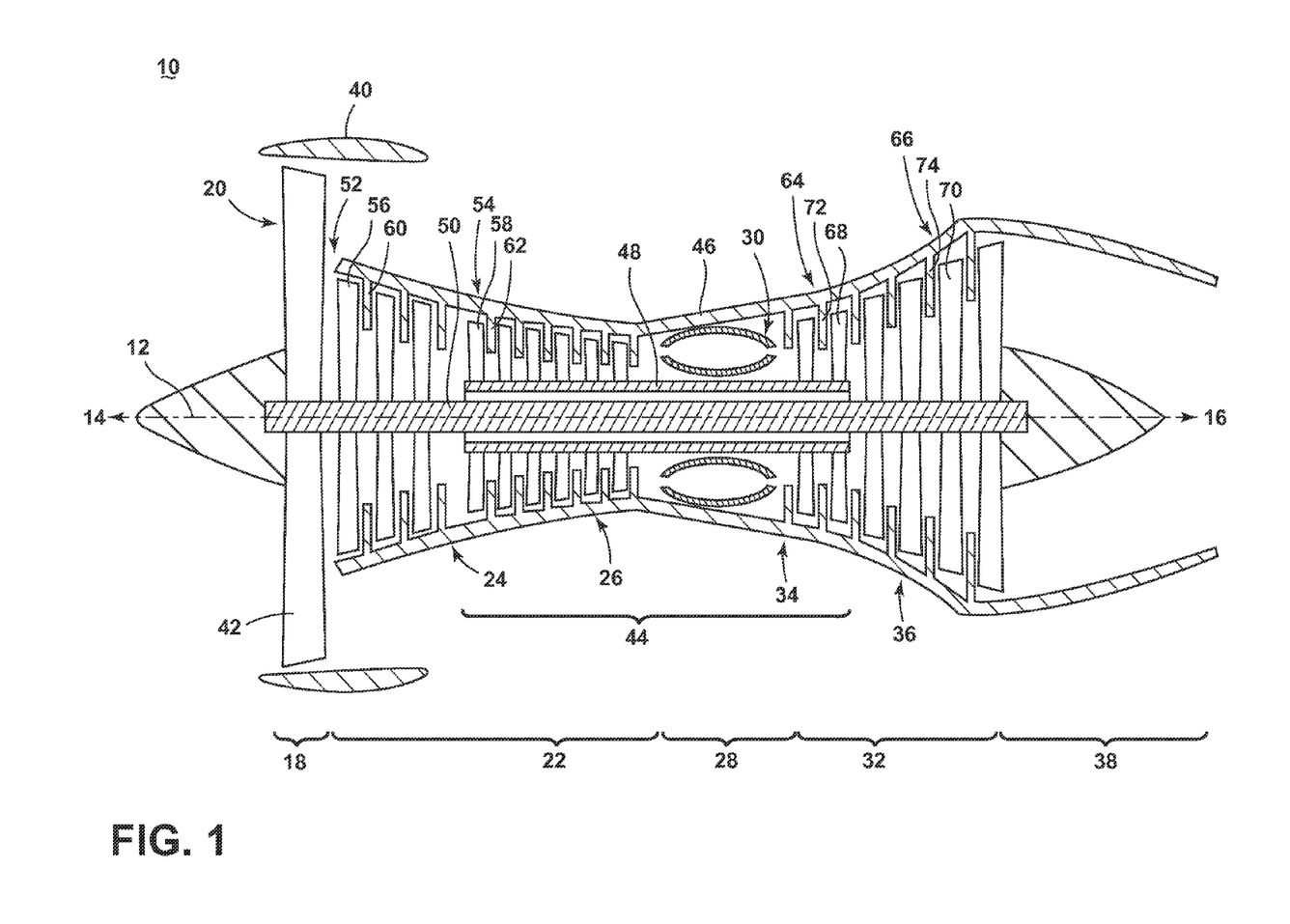
FIG. 1 is a schematic cross-sectional diagram of a gas turbine engine for an aircraft according to a first embodiment of the invention.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 to compress or pressurize the stream of fluid passing through the stage. In a single compressor stage 54, multiple compressor blades 58 can be provided in a ring and can extend radially outwardly relative to the engine centerline 12, from a blade platform to a blade tip, while the corresponding static compressor vanes 62 are positioned downstream of and adjacent to the rotating blades 58. It is noted that the number of blades, vanes, and compressor stages shown in FIG. 1 were selected for illustrative purposes only, and that other numbers are possible. The blades 58 for a stage of the compressor can be mounted to a disk 53, which is mounted to the corresponding one of the HP and LP spools 48, 50, with each stage having its own disk 53. The vanes 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, multiple turbine blades 68 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
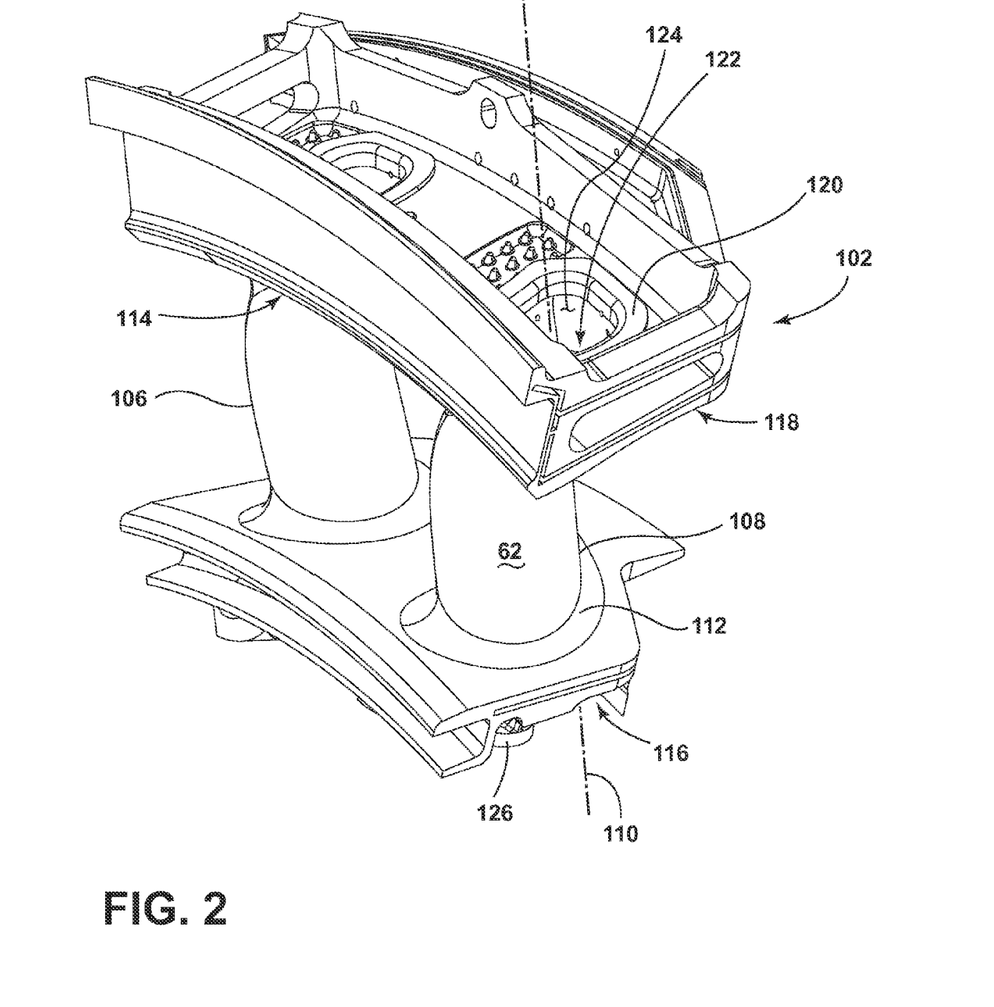
FIG. 2 is a perspective view of a vane assembly.

Referring to FIG. 2 a vane assembly 102 including the vane 62 will be described in greater detail. The vane 62 is shaped as an airfoil body wherein the vane 62 has a leading edge 106 and trailing edge 108. The vane 62 spans radially along a radial line 110 from a root 112 to a tip 114, where the root 112 is mounted to an inner platform 116 and the tip 114 is mounted to an upper plate 118. A flow control insert 120, such as an impingement insert, referred from now on simply as an insert, is located within the vane 62 and defines a conduit 122 having an inlet 124 located at the tip of the vane 62.

Figure 3:
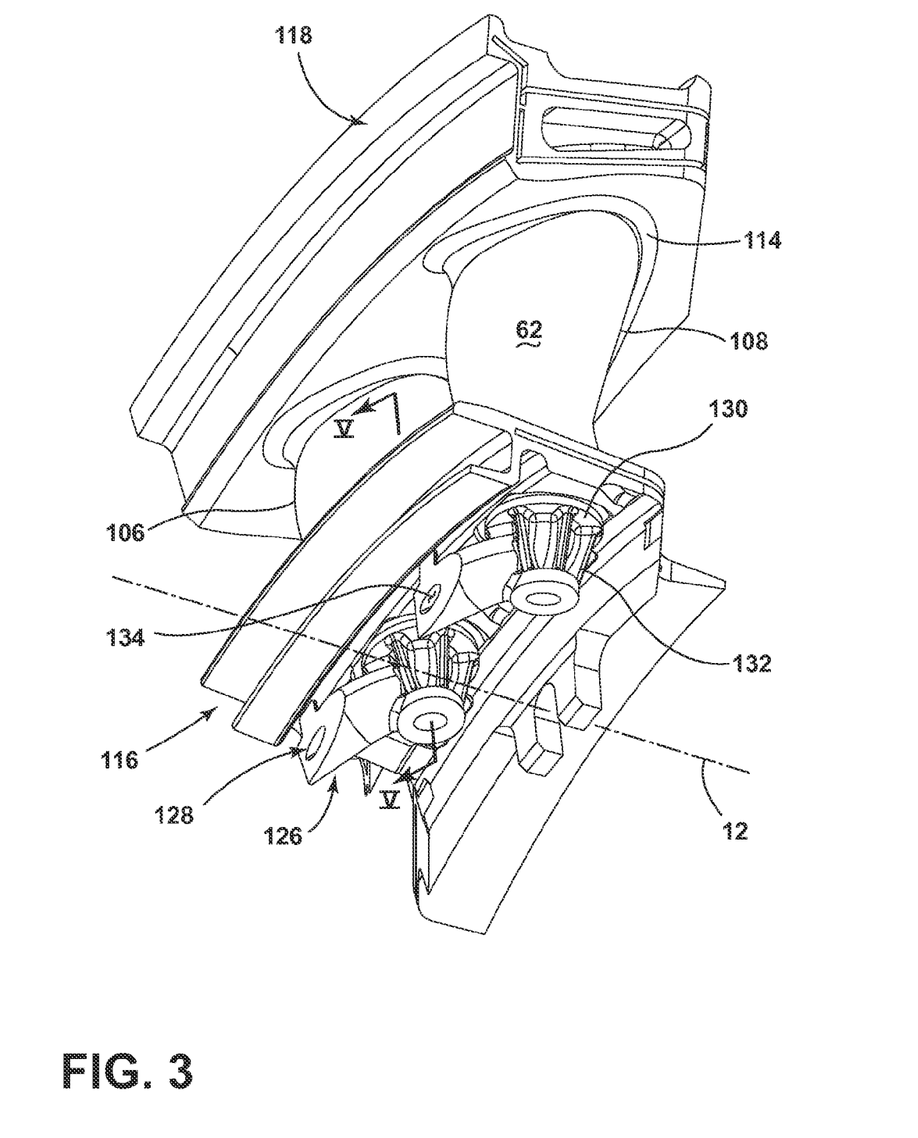
FIG. 3 is an inboard perspective view of the vane assembly of FIG. 2 including a turning nozzle.

Referring to FIG. 3, looking at the inboard of the vane assembly 102, it is shown that a turning nozzle 126 is mounted to the inner platform 116. The turning nozzle 126 includes a turning passage 128 and a shoulder 130 which abuts the inner platform 116 and is secured to the inner platform 116 using a metal joint by means of welding, brazing, soldering, or the like. Multiple fins 132 extend radially from the turning passage 128 below the shoulder 130 to conduct heat away from the turning passage 128. The turning passage 128 terminates in an outlet 134.

Figure 4:
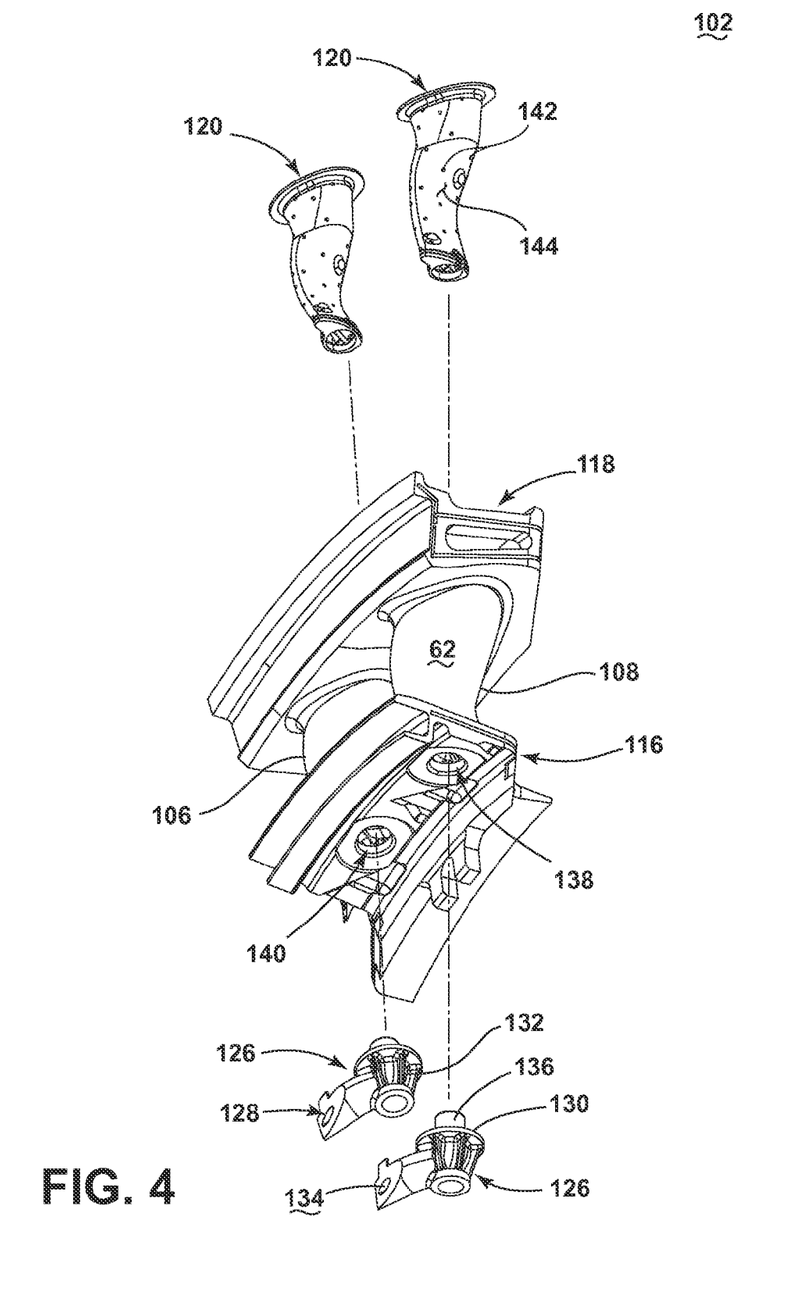
FIG. 4 is an exploded view of the vane assembly of FIGS. 2 and 3.

FIG. 4 is an exploded view of the vane assembly 102 from FIG. 3 and illustrates that the turning passage 128 further includes an insertion portion 136 having a turning passage inlet 125 (FIG. 5) above the shoulder 130 that is received within a conduit outlet illustrated as an inner platform opening 138 wherein the shoulder 130 functions as an insertion stop. This insertion portion 136 fluidly couples the turning passage 128 to the insert conduit 122.

The vane further comprises a cooling air passage or conduit passage 140 in which the insert 120 is placed so that the insert conduit 122 is encompassed by the vane's conduit passage 140. The insert 120 includes multiple holes 142, or impingement openings, which are located along the insert walls 144. The impingement openings provide a fluid connection between the conduit 122 and the conduit passage 140 when the vane assembly 102 is fully assembled.

As illustrated in FIGS. 2-4, a pair of vanes 62 are shown, which collectively define a gap there between, which is referred to as a nozzle. Also, while the vane assembly 102 is shown as comprising a vane 62, inner platform 116, outer platform 115, insert 120, and turning nozzle 126, the vane assembly 102 can include fewer or more components.

Figure 5:
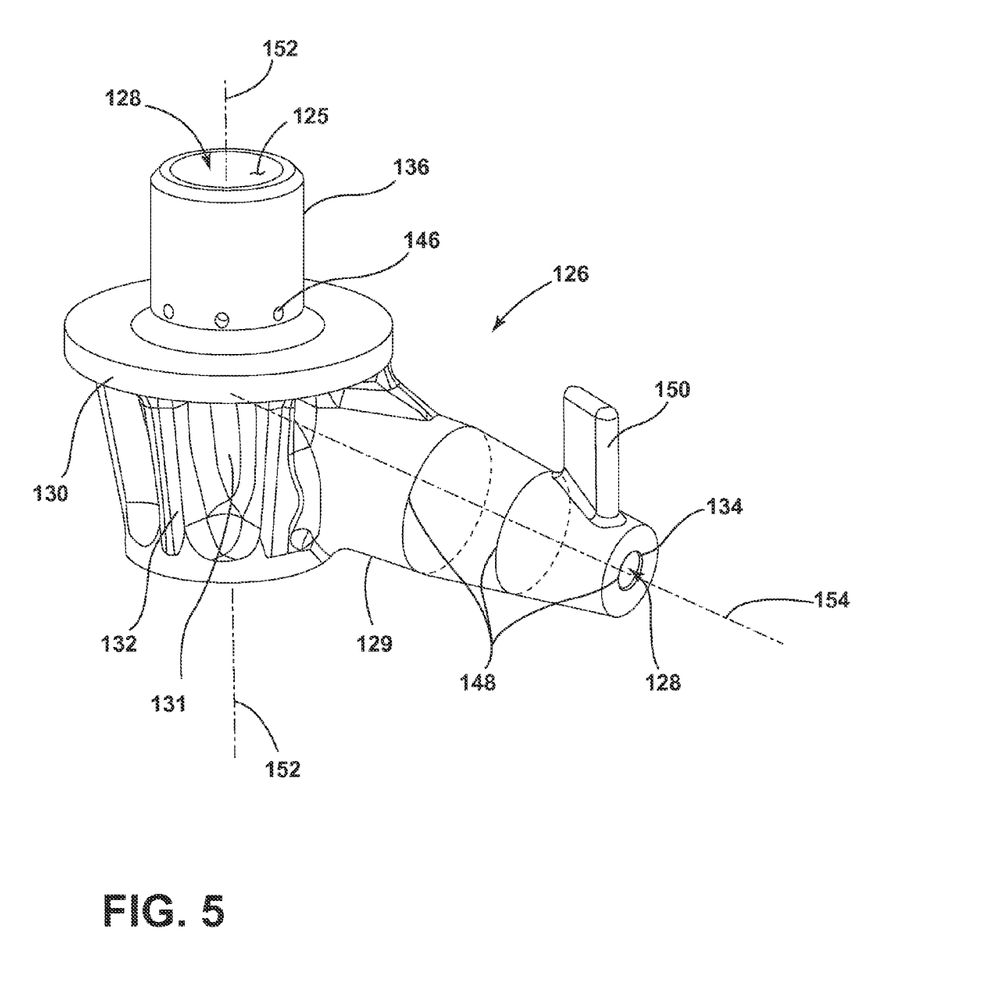
FIG. 5 is a perspective view of a turning nozzle shown in FIGS. 3 and 4.

Referring now to FIG. 5, the details of the turning nozzle 126 will be described. The turning nozzle 126 defines a turning passage 128 having an inlet 125 and the outlet 134, with a turn 131. The turning nozzle 126 has an elbow-like shape with insertion portion 136 and an acceleration portion 129, with the turn 131 located at the transition of the insertion portion 136 to the acceleration portion 129. The inlet 125 is located in the insertion portion 136 and the outlet 134 is located in the second portion. While illustrated as an elbow-like shape, other shapes are possible for the turning nozzle 126.

The shoulder 130 located between the inlet 125 and the outlet 134 also functions to limit the insertion of the insertion portion 136 of the turning nozzle 126 by providing a stopping point for the insertion portion 136. As illustrated the shoulder 130 is located on the insertion portion 136 upstream of the turn 131. Optional openings 146 can be provided above the shoulder 130, which enables further cooling of the interior of the vane 62, especially the junction of the turning nozzle 126 and the vane 62.

A reduced cross-sectional area 148 is provided in the turning passage 128. As illustrated the acceleration portion 129 comprises the reduced cross-sectional area 148. However, it can be located anywhere along the turning passage 128, with it being most effective near the outlet 134. The cross-sectional area 148 is illustrated as having a continuously reducing cross-sectional area. However, the reduced cross-sectional area 148 can be continuous or discontinuous, including a singular reduced cross-sectional area or a series of reduced cross-sectional areas.

A rotation stop 150 projects from the turning passage 128 to fix a rotational position of the turning nozzle 126 relative to the vane 62. When the turning nozzle 126 is mounted to the vane 62 by the insertion of the insertion portion 136 until the shoulder 130 abuts the vane 62 or inner platform 116, as the case may be, it is then rotated to a position until the rotation stop 150 abuts another structural portion, which can be a portion of the inner platform 116, to limit the rotation of the turning nozzle 126. In this sense, the rotational stop also fixes the position of the outlet 134 relative to the rotor 51, including relative to the engine centerline 12 and a radial line 110 extending perpendicularly from the engine centerline 12. The turning passage turns from a majority radial orientation along a portion 152 to a majority parallel to a plane 155 perpendicular to the rotational axis along a portion 154.

Figure 6:
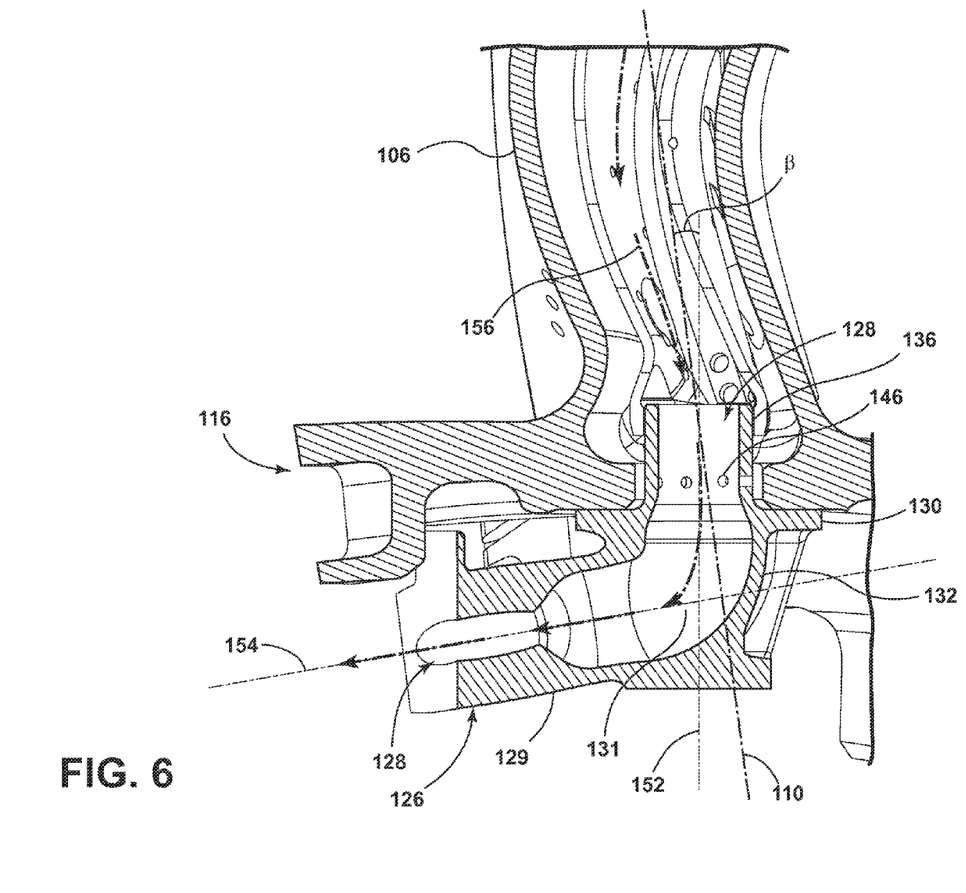
FIG. 6 is an enlarged cross-sectional view of the vane assembly taken along line V-V of FIG. 3.

Referring to FIG. 6, the turning passage 128 has a turning passage centerline, which has a different orientation upstream as compared to downstream of the turn 131. Purge air flow 156 is cooling air which travels through the insert conduit 122 into the turning nozzle 126 along the portion 152 and exits along the portion 154 at the turning nozzle outlet 134. Upstream of the turn 131, the portion 152 of the turning passage centerline is generally aligned with the radial line 110. An angle, β, is formed between the turning passage centerline portion 152 and the radial line 110. The turning passage 128 may be oriented such that the angle is zero degrees. In most cases, the angle, β, will be a small acute angle, less than 10 degrees.

Figure 7:
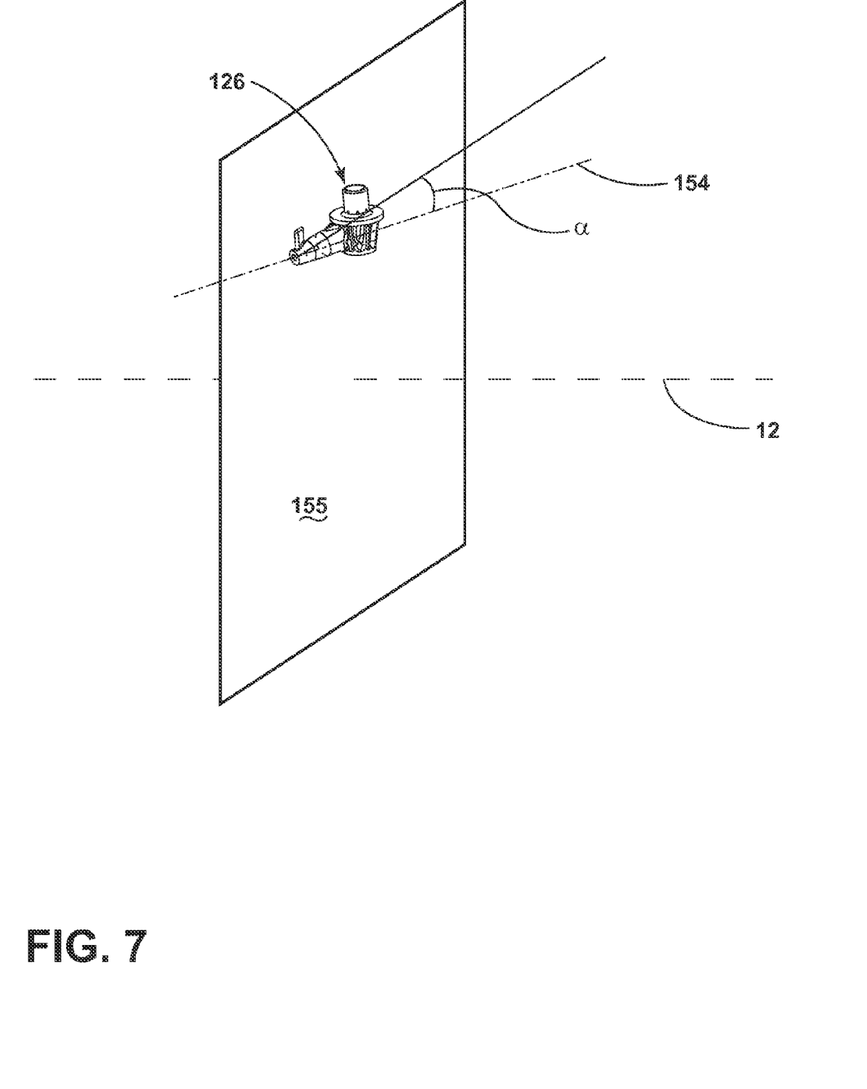
FIG. 7 is a schematic illustrating the engine centerline, a plane perpendicular to said centerline with relation and angle at which the turning nozzle is assembled.

Referring to FIG. 7 the portion 154 of the turning passage centerline forms an angle, α, relative to a plane 155 perpendicular to the engine centerline 12, which is also the rotational axis of the engine. This angle is an acute angle α. It is contemplated that the angle α will be relatively small, less than 10 degrees. In most cases, it is desirable for the angle α to be as close to zero as practical for a given implementation. The closer angle α is to zero, the closer the purge air flow 156 exiting the outlet 134 is tangential to the plane 155.

In operation, the turning nozzle 126 effects a turning of the purge air flow 156 exiting the vane 62 in such a way to reduce pressure losses associated with the turn. The amount of the turn is generally 90 degrees relative to the radial line 110 and is contemplated to be between 80 and 90 degrees. The smooth turn 131 aids in the turning of the purge air flow 156 without substantial pressure losses and minimal heating of the cooling air. The turn 131 is not a sharp corner, instead, it comprises a smooth, arc-like, transition that provides for the turning of the purge air flow 156 without the pressure losses associated with a corner.

The turning nozzle 126 also aligns the purge air flow 156 exiting the outlet 134 such that it is substantially tangential with the plane 155. As the exiting purge air flow 156 becomes closer to tangential with the plane 155 there is an otherwise greater reduction in rotating air's total temperature, as smaller frictional fluid losses (drag) are generated as the velocity of the incoming purge air jet matches velocity of rotating air.

The turning nozzle 126 also directs the exiting purge air flow 156 in the direction of rotation of the disk 53 while the reduced cross-sectional area 148 accelerates the purge air flow 156 relative to the rotational speed of the disk 53 of the rotor 51. The closer the speed of the purge air flow 156 to the rotational speed of the disk 53 also increases efficiency as the purge air flow 156 does not create an air flow that the disk 53 must drive through which reduces drag on the rotating disk 53. In the exemplary embodiment the speed of the cooling air exiting the nozzle should be as high as design constraints allow to minimize frictional forces, or drag, and minimize cooling air temperature. The speed of air exiting the nozzle at the point where it strikes the rotor should be as close as possible to rotor speed.

In production the turning nozzle can be cast or 3D printed or produced by a means that will still reduce air leaks occurring at the interface with the insertion portion, reduce pressure losses as purge air exits the nozzle, and minimize heating of the cooling air associated with hard turns and high loss openings/exits. When the turning nozzle is in place it is self-centering, in that it will align with the insert hole, and keyed in that it is designed to fit with existing nozzle features.

As described above the turning nozzle is a separate piece that when assembled to a vane segment including an impingement insert, reduces pressure losses with routing purge air from insert cavity to wheel space cavity translating into higher purge air velocities from the turning nozzle outlet. This is a benefit since high pressure drops when turning the purge air are typically associated with hard turns and obstructions forcing the purge air to recirculate or "scrub" the internal insert/purge nozzle hot surfaces, resulting in a temperature rise of the purge air, which in turn is detrimental to the rotor system and reduces the rotor life.

Further benefits of the turning nozzle include providing for full flexibility in choosing purge air vector direction which is typically achieved by imparting as much tangential component, with respect to the rotor plane, as possible, such that frictional loses in wheel space cavity are minimized.

The turning nozzle also allows air to transfer from the insert cavity to the wheel space cavity with minimal leaks occurring at the interface between the insertion portion of the attachment and the interfacing impingement insert.

It should be appreciated that application of the turning nozzle is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A vane assembly for a gas turbine engine having a rotational axis, the vane assembly comprising:
   a vane having an airfoil body extending axially from a leading edge to a trailing edge and extending radially from a root to a tip;
   a cooling air passage extending radially through the airfoil body and having an inlet at the tip and an outlet at the root;
   a flow control insert provided within the cooling air passage and defining a conduit having an inlet corresponding with the cooling air passage inlet and an outlet corresponding with the cooling air passage outlet; and
   a turning nozzle mounted to the vane and having a turning passage with an inlet and an outlet, the turning nozzle inlet being fluidly coupled to the flow control insert outlet, and the turning passage is such that a turning passage centerline from the turning passage outlet forms a first acute angle relative to a plane generally perpendicular to the rotational axis;
   wherein the turning passage centerline aligns with a generally radial line extending from the rotational axis at the turning passage inlet and forms a second acute angle relative to the radial line; and wherein the turning nozzle is oriented such that the turning passage centerline extends through the turning passage outlet in a direction of rotation for the rotational axis.

2. The vane assembly of claim 1 wherein the second acute angle is zero degrees into the direction of rotation.

3. The vane assembly of claim 1 wherein the turning nozzle comprises a reduced cross-sectional area portion to accelerate cooling air as it passes through the turning passage.

4. The vane assembly of claim 1 wherein the turning passage inlet is received within the conduit outlet.

5. The vane assembly of claim 1 wherein the vane comprises an inner platform at the root and the turning nozzle is mounted to the inner platform.

6. The vane assembly of claim 1 wherein the turning nozzle comprise multiple fins extending from the turning passage to conduct heat away from the turning passage.

7. A vane assembly for a gas turbine engine having a rotational axis, the vane assembly comprising:
a vane having an airfoil body extending axially from a leading edge to a trailing edge and extending radially from a root to a tip;
a cooling air passage extending radially through the airfoil body and having an inlet at the tip and an outlet at the root;
a flow control insert provided within the cooling air passage and defining a conduit having an inlet corresponding with the cooling air passage inlet and an outlet corresponding with the cooling air passage outlet; and
a turning nozzle mounted to the vane and having a turning passage with an inlet and an outlet, the turning nozzle inlet being fluidly coupled to the flow control insert outlet, and the turning passage is such that a turning passage centerline from the turning passage outlet forms a first acute angle relative to a plane generally perpendicular to the rotational axis;
wherein the vane comprises an inner platform at the root and the turning nozzle is mounted to the inner platform; and
wherein the turning nozzle comprises a shoulder that abuts the inner platform and the shoulder is secured to the inner platform.

8. The vane assembly of claim 7 wherein the inner platform has an opening fluidly coupled to the conduit outlet, the turning passage has an insertion portion above the shoulder that is received within the inner platform opening and the shoulder functions as an insertion stop, and the turning nozzle comprises a rotation stop projecting from the turning passage to fix a rotational position of the turning nozzle relative to the vane, whereby the turning nozzle is mounted to the vane by inserting the insertion portion into the inner platform opening until the shoulder abuts the platform and then rotating the turning nozzle until the rotation stop stops the rotation.

9. The vane assembly of claim 8 further comprising a metal joint securing the shoulder to the inner platform, and the insertion portion has multiples holes supplying cooling air from the turning passage toward the metal joint.

10. A vane assembly for a gas turbine engine having a rotational axis, the vane assembly comprising:
a vane having an airfoil body extending axially from a leading edge to a trailing edge and extending radially from a root to a tip;
a cooling air passage extending radially through the airfoil body and having an inlet at the tip and an outlet at the root;
a flow control insert provided within the cooling air passage and defining a conduit having an inlet corresponding with the cooling air passage inlet and an outlet corresponding with the cooling air passage outlet; and
a turning nozzle mounted to the vane and having a turning passage with an inlet and an outlet, the turning nozzle inlet being fluidly coupled to the flow control insert outlet, and the turning passage is such that a turning passage centerline from the turning passage outlet forms a first acute angle relative to a plane generally perpendicular to the rotational axis;
wherein the turning nozzle comprise a rotation stop projecting from the turning passage to fix a rotational position of the turning nozzle relative to the vane.

11. A vane assembly for a gas turbine engine having a rotational axis, the vane assembly comprising:
a vane having an airfoil body extending axially from a leading edge to a trailing edge and extending radially from a root to a tip;
a cooling air passage extending radially through the airfoil body and having an inlet at the tip and an outlet at the root;
a flow control insert provided within the cooling air passage and defining a conduit having an inlet corresponding with the cooling air passage inlet and an outlet corresponding with the cooling air passage outlet; and
a turning nozzle mounted to the vane and having a turning passage with an inlet and an outlet, the turning nozzle inlet being fluidly coupled to the flow control insert outlet, and the turning passage is such that a turning passage centerline from the turning passage outlet forms a first acute angle relative to a plane generally perpendicular to the rotational axis;
wherein the turning passage turns through at least a 45 degree angle.

12. The vane assembly of claim 11 wherein the turning passage turns through at least a 90 degree angle.

13. The vane assembly of claim 11 wherein the turning passage turns from a majority radial orientation relative to the rotation axis at the turning passage inlet to a majority parallel to a plane perpendicular to the rotational axis at the turning passage outlet.

14. The vane assembly of claim 13 wherein the turning passage comprises a reduced cross-sectional area to accelerate the cooling air passing through the turning passage.

15. The vane assembly of claim 14 wherein the reduced cross-section area comprises a continuously reducing cross-sectional area near the turning passage outlet.

16. The vane assembly of claim 15 wherein the continuously reducing cross-section area accelerates the cooling air to a speed at the turning passage outlet that is within 20% of an engine operating rotational speed.

17. The vane assembly of claim 16 wherein the flow control insert comprises an impingement insert having multiple impingement openings to supply cooling air from the conduit.

18. A turning nozzle for a vane of a gas turbine engine having a rotational axis, the turning nozzle comprising a turning passage with an inlet and an outlet, the turning passage locally turning through a smooth turn at least 45 degrees, and the turning passage having a reduced cross-sectional area downstream of the smooth turn, wherein when the turning nozzle is mounted to the vane, the turning passage turns the flow exiting the vane, which is generally radial to the rotational axis, to a flow that is generally tangential to a plane define by rotation of a radial line about rotational axis.

19. The turning nozzle of claim 18 wherein the reduced cross-section area comprises a continuously reducing cross-sectional area near or at the turning passage outlet.

20. The turning nozzle of claim 19 wherein the continuously reducing cross-section area accelerates the cooling air to a speed at the turning passage outlet that is within 20% of an engine operating rotational speed.

21. The turning nozzle of claim 18 further comprising a shoulder upstream of the smooth turn and which functions as an insertion stop.

22. The turning nozzle of claim 21 further comprising holes passing through the turning passage upstream of the shoulder.

23. The turning nozzle of claim 18 further comprising multiple fins extending from the turning passage to conduct heat away from the turning passage.

24. The turning nozzle of claim 23 wherein the multiple fins extend upstream of the smooth turn.

25. The turning nozzle of claim 18 further comprising a rotation stop projecting from the turning passage.

26. The turning nozzle of claim 25 wherein the rotation stop is downstream of the smooth turn.

* * * * *